United States Patent [19]

Yoshida et al.

[11] Patent Number: 4,550,700

[45] Date of Patent: Nov. 5, 1985

[54] INTAKE SYSTEM FOR MULTI-INTAKE VALVE TYPE ENGINE

[75] Inventors: Takumori Yoshida, Iwata; Akira Yamada, Shizuoka; Sadayuki Shinmura, Iwata, all of Japan

[73] Assignee: Yamaha Hatsudoki Kabushiki Kaisha, Japan

[21] Appl. No.: 597,815

[22] Filed: Apr. 9, 1984

Related U.S. Application Data

[63] Continuation of Ser. No. 332,825, Dec. 21, 1981, abandoned.

[30] Foreign Application Priority Data

Dec. 22, 1980 [JP] Japan ................ 55-182223

[51] Int. Cl.⁴ .......................... F02M 35/10
[52] U.S. Cl. ................ 123/432; 123/52 M; 123/445
[58] Field of Search ............ 123/308, 432, 442, 393, 123/52 M, 445

[56] References Cited

U.S. PATENT DOCUMENTS

| | | | |
|---|---|---|---|
| 3,211,137 | 10/1965 | Love | 123/432 |
| 4,098,368 | 7/1978 | Riddel | 123/393 |
| 4,246,874 | 1/1981 | Nakagawa et al. | 123/308 |
| 4,271,801 | 6/1981 | Yamakawa et al. | 123/308 |
| 4,276,862 | 7/1981 | Matsumoto | 123/432 |
| 4,317,438 | 3/1982 | Yagi et al. | 123/308 |
| 4,381,738 | 5/1983 | Shaffer | 123/432 |

FOREIGN PATENT DOCUMENTS 0160156 12/1980 Japan .................. 123/445

Primary Examiner—Parshotam S. Lall
Assistant Examiner—W. R. Wolfe
Attorney, Agent, or Firm—Ernest A. Beutler

[57] ABSTRACT

Several embodiments of induction systems for internal combustion engines that achieve high power outputs without sacrificing low and medium speed running characteristics or without adverse transitional effects. Each embodiment employs a pair of intake valves connecting with each combustion chamber and served by separate intake passages. A control valve is positioned at one of the intake passages and is operated so that the idle and low load requirements are primarily served by the other intake passage. An interconnecting passage interconnects the two intake passages downstream of the control valve and close to the engine valves to improve transitional performance and mid-range torque. In one embodiment of the invention the control valve is operated in response to engine speed and load as sensed in the induction system. In another embodiment an unbalanced control valve is employed that is operated by pressure differences in the induction system. In yet another embodiment the control valve is operated in response to the exhaust gas pressure. In still another embodiment a piston type control valve is employed.

24 Claims, 7 Drawing Figures

INTAKE SYSTEM FOR MULTI-INTAKE VALVE TYPE ENGINE

This application is a continuation of application Ser. No. 322,825, filed Dec. 21, 1981, now abandoned.

BACKGROUND OF THE INVENTION

This invention relates to an intake system for a multi-intake valve type engine, and more particularly to an induction system that permits high performance without sacrificing low speed running characteristics or good transitional running.

It is known that the maximum power output of an engine can be improved by providing multiple intake valves each served by a respective intake passage. Such an arrangement improves the breathing ability and, accordingly, permits significant power improvements over single valve engines. However, such arrangements are normally used only in high performance automotives wherein smooth running at low speeds and low and medium speed torques are not particularly important. Normally such high output engines do not run well at low speeds because the velocity of air flow at such low speeds is insufficient to insure the delivery of a uniform charge to the chambers and efficient combustion in the chambers.

It has been proposed to improve the running characteristics of such engines at low speeds by providing a control valve in the intake passage with one of the intake valves so that flow through this passage is either restricted or completely obstructed at low speeds. Such an arrangement has the effect of increasing the velocity of the charge delivered to the chambers due to an effective restriction in the intake passage area. The increased velocity improves running characteristics. However, such arrangements, as have been previously proposed, provide relatively poor transitional running.

It is, therefore, a principal object of this invention to provide an improved induction system for an internal combustion engine.

It is another object of the invention to provide an engine induction system in which maximum performance is achieved without sacrificing good running at low and transitional conditions.

As has been noted, it has been proposed to provide a control valve for controlling the flow through one of the engine induction passages to improve low speed performance. Previously this has been done by virtue of aa mechanical linkage system that delays opening of the control valve until a predetermined of the main throttle valve has occurred. However, such an arrangement is not fully indicative of the actual running conditions and may not provide the degree of induction system control necessary to achieve the aforenoted purposes.

It is, therefore, a still further object of this invention to provide an improved throttle control arrangement for a multiple intake passage type of internal combustion engine induction system.

In engines embodying multiple intake passages for each chamber, it is also desirable to insure good fuel distribution to the chamber through the respective intake passages. If a fuel injection system is used, this problem becomes particularly acute.

It is, therefore, a still further object of this invention to provide in an improved multiple intake passage induction system for an engine an improved fuel injection arrangement.

In engines of the type described above and in certain other types of engines, it may be desirable to provide a throttle valve in an intake passage that is controlled in response to engine load. In accordance with another feature of this invention, it is an object to provide an improved control arrangement for such a throttle valve.

SUMMARY OF THE INVENTION

A first feature of this invention is adapted to be embodied in an induction system for an internal combustion engine of the type having a pair of intake ports serving the same chamber of the engine. Separate intake passages each independently serve a respective one of the intake ports. Throttle valve means control the flow through the intake passages so that the idle charge is delivered to the chamber through a first of the intake passages and the wide open load charge requirements are supplied through both of the induction passages. In accordance with this feature of the invention, an interconnecting passage extends between the first intake passage and the second intake passage in proximity to the intake ports.

Another feature of the invention is adapted to be embodied in an induction system for an engine having a pair of intake ports serving the same chamber of the engine and separate intake passages independently serving a respective one of the intake ports. Throttle valve means control the flow through the intake passages. In accordance with this feature of the invention, load responsive means are incorporated for controlling the throttle valve means so that the idle charge is delivered to the throttle through a first of the intake passages and the wide open charge requirements are supplied through both of the intake passages.

Yet another feature of the invention is adapted to be embodied in an engine of the type having pairs of intake ports and separate intake passages serving each the same chamber of the engine. In accordance with this feature of the invention, an interconnecting passage extends between the intake passage and is defined in part by a wall. A fuel injection nozzle is disposed so that it discharges against the wall.

Yet another feature of the invention is adapted to be embodied in an intake system for an internal combustion engine having an intake passage, a throttle valve for controlling the flow through the intake passage and means for controlling the position of the throttle valve in response to the pressure in the exhaust of the engine.

Figure 1:
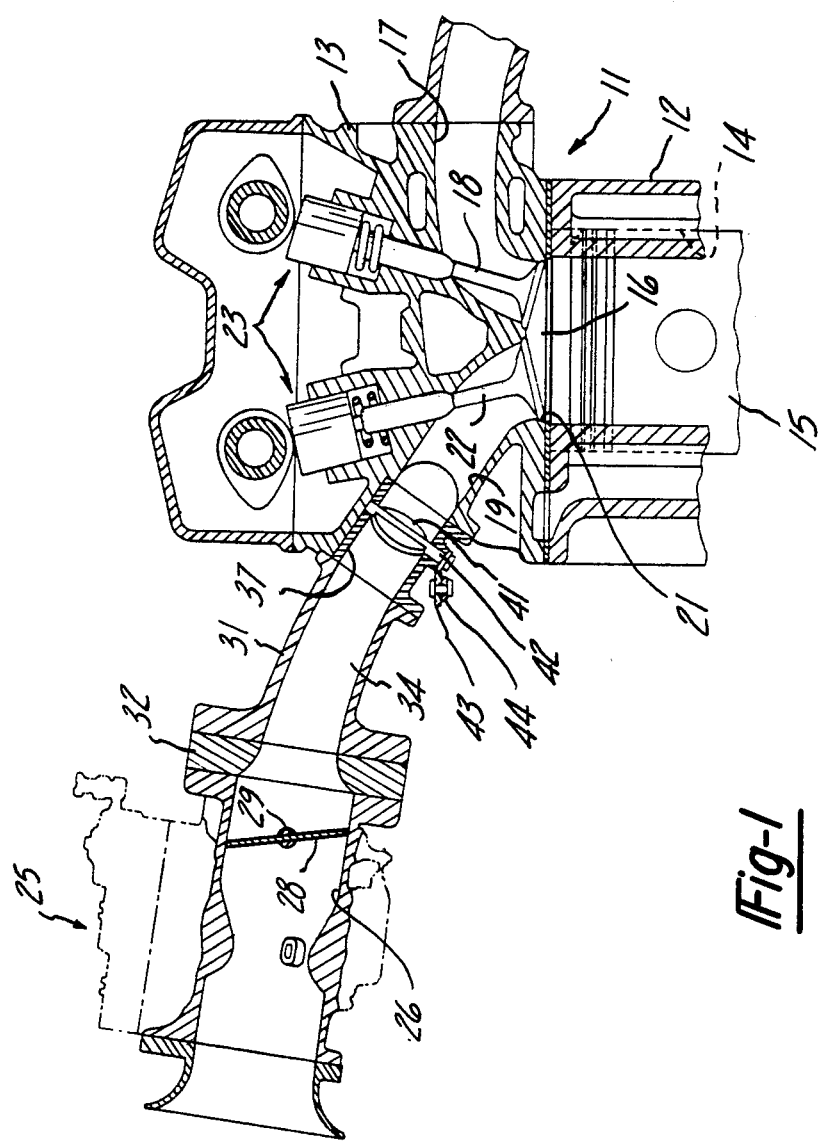
FIG. 1 is a partial cross-sectional view taken through a cylinder of an internal combustion engine constructed in accordance with a first embodiment of the invention, and is taken generally along the line 1—1 of FIG. 2.
Figure 2:
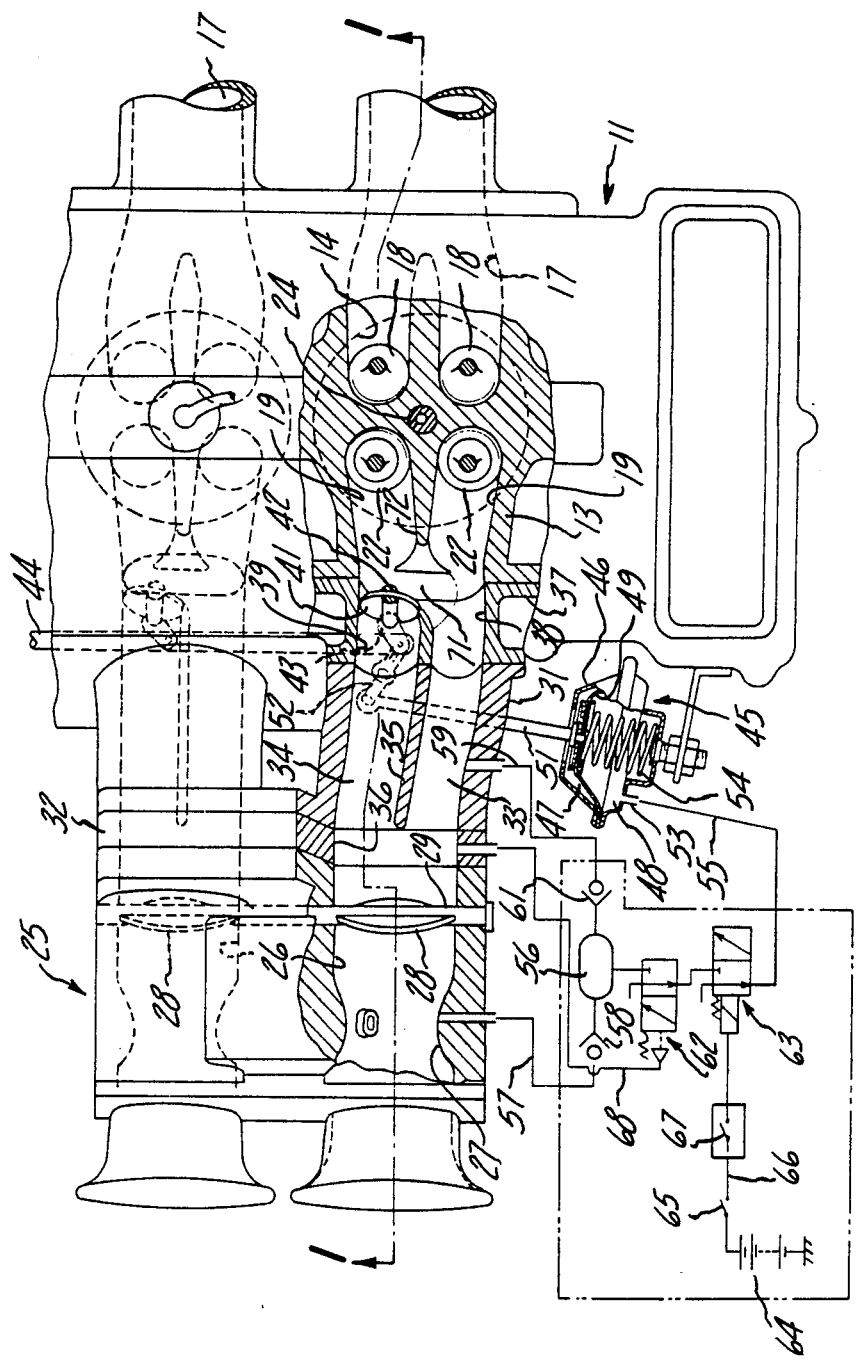
FIG. 2 is a top plan view of a portion of an engine of this embodiment with portions broken away and other portions shown schematically.

DETAILED DESCRIPTION OF THE PREFERRED EMBODIMENTS
Embodiment of FIGS. 1 and 2.

An internal combustion engine constructed in accordance with a fist embodiment of the invention is shown in FIGS. 1 and 2 and is identified generally by the reference numeral 11. In the illustrated embodiment the engine 11 is of the 4-cylinder, in-line type. Only the details associated with a single of the cylinders of the engine have been illustrated since it is believed obvious to those skilled in the art from this description how the invention is applied to the remaining cylinders. Furthermore, it is to be understood that the invention is susceptible of use with engines having other cylinder numbers and configurations, and in fact certain aspects may be used with rotary type or other types of engines.

The engine 11 includes a cylinder block 12 to which a cylinder head 13 is affixed in a known manner. The cylinder block 12 is formed with cylinder bores 14 in which pistons 15 are supported for reciprocation. The cylinder head 13 is formed with cavities 16 that cooperate with the cylinder bores 14 and pistons 15 to define the combustion chambers. At times the cavities 16 will be referred to as the combustion chambers.

The cylinder head 13 is formed with a pair of exhaust passages 17 that extend from each combustion chamber 16 for discharge of the exhaust gases. Exhaust valves 18 are provided in pairs for each cylinder 14 and control the flow through the exhaust passages 17 in a known manner.

A pair of intake passages 19 extend through the opposite side of the cylinder head 13 for each cylinder bore 14 and terminate in intake ports 21. Pairs of intake valves 22 open and close the intake ports 21 so as to control the admission of an intake charge to the chambers 16. The exhaust valves 18 and intake valves 22 are operated in a known manner, as by means of a pair of overhead cam shafts indicated generally by the reference numeral 23.

A spark plug 24 is positioned centrally of each combustion chamber 16 in the cyliner head 13. The spark plugs 24 are fired by means of any suitable ignition system (not shown) for firing the charge in the chambers 16.

A charge forming device is supplied for delivering a fuel air charge to the combustion chambers 16. In this embodiment the charge forming device consists of two barrel carburetors, indicated generally by the reference numeral 25. Each carburetor 25 has a pair of main intake passages 26 each of which is provided with a known type of fuel discharge system. Each barrel 26 serves a respective combustion chamber 16. Although an arrangement is illustrated in this embodiment whereby a single carburetor barrel serves each combustion chamber, it is to be understood that the invention is equally adapted to an arrangement wherein one carburetor barrel serves more than a single cylinder. It is believed that the application of the invention to such an carburetion system should be readily apparent to those skilled in the art.

Each carburetor barrel 26 is provided with a venturi section 27. Downstream of the venturi section 27, a throttle valve 28 is provided for controlling the flow of the intake charge. The throttle valves 28 associated with each of the barrels 26 are affixed to a common throttle valve shaft 29 so that the throttle valves 28 will be opened in unison.

An intake manifold, indicated generally by the reference numeral 31, is interposed between each carburetor 25 and the cylinder head 13. Insulating spacers 32 are interposed between the carburetors 25 and the manifold 31. The manifold 31 is provided with a primary intake passage 33 and a secondary intake passage 34 for each carburetor barrel 26. The primary and secondary manifold passages 33 and 34 are separated by a wall 35. Intake passages 36 formed in the spacers 32 provide communication between the barrels 26 and the inlets to the primary and secondary manifold passages 33, 34.

A valve block 37 is interposed between the manifold 31 and the cylinder head 13. As will be described, the valve block 37 supports control valves that are operative to preclude any significant charge flow through the manifold secondary passages 34 during low speed and low load running of the engine.

To this end the valve block 37 is provided with a primary passage 38 and a secondary passage 39 which are aligned respectively with the manifold primary and secondary passages 33, 34. A control valve 41 is positioned in the valve block secondary passage 39 and is rotatably supported by a control valve shaft 42. A lever 43 is affixed to each control valve shaft 42 and the levers 43 associated with each of the carburetor barrels are interconnected by a link 44 so that the control valves 41 will all be operated in unison.

A pressure responsive actuator, indicated generally by the reference numeral 45, is provided for operating the control valves 41 so that they will be closed at low speeds and low loads and will be opened when the speed of the engine and load exceed a predetermined amount. The actuator 45 includes a housing 46 that is divided into an atmospheric chamber 47 and a vacuum chamber 48 by means of a diaphragm 49. The diaphragm 49 is affixed in a suitable manner to a actuating rod 51 which, in turn, is pivotally connected at its outer end to a link 52 that is coupled to the link 44 for rotating the control valve shafts 42 and control valves 41 carried thereby.

The atmospheric chamber 47 of the actuator 45 is continuously vented to atmospheric pressure by a clearance between the housing 46 and the rod 51. The vacuum chamber 48 is provided with a sensing port 53 which is provided with either a vacuum signal or an atmospheric signal in a manner to be described. A coil compression spring 54 is positioned within the vacuum chamber 48 for normally urging the diagraphm 49 and rod 51 to a position wherein the control valves 41 will be either fully or substantially fully closed until the vacuum in the chamber 48 is sufficient so that the atmospheric pressure in the chamber 47 will overcome the pressure of the spring 54.

A conduit, indicated schematically at 55, is connected to the sensing port 53 of the actuating device 45 for selectively applying atmospheric pressure to the chamber 48 or the vacuum signal from a vacuum reservoir 56. The reservoir 56 is evactuated to a sub-atmospheric pressure either through a conduit 57 and check valve 58 in response to the air flow through the venturi 27 of the carburetor barrel 26 of in response to intake manifold vacuum through a conduit 59 and check valve 61. The reduced pressure existent in the reservoir 56 is selectively transmitted to the chamber 48 of the actuator 45 by means of a pressure responsive valve, indicated generally at 62, and a speed responsive, electrically operated valve 63.

The valve 63 has a winding that is in circuit with the vehicle battery 64 through the main ignition switch 65 and a conduit 66 in which a speed responsive switch 67 is positioned. When a voltage is not applied to the winding of the valve 63, it will be urged by a spring to a position wherein the conduit 55 is vented to the atmosphere. Under this condition the pressure in the chambers 47 and 48 of the actuator 45 will be the same, and the spring 54 will urge the diaphragm 49 in a direction so that the control valves 41 will be closed.

The valve 62 is responsive to the pressure in the intake manifold downstream of the throttle valves 28, and for this purpose a sensing line 68 extends from the valve 62 to a sensing port in the insulating spacer 32.

The operation of this embodiment will now be described. When the engine is running at a low speed and under lightly loaded conditions, the speed switch 67 will be opened and the speed responsive valve 63 will be positioned to vent the actuator chamber 48 to the atmosphere. Thus, the control valves 41 will be closed and the fuel air charge delivered by the carburetor barrel 26 will be delivered to the chambers 16 primarily through the primary manifold passage 33. During this condition there will be a relatively high intake manifold vacuum transmitted through the conduit 68 and the valve 62 will be held in a position wherein comunication between the reservoir 56 and the speed responsive valve 63 is precluded. In this condition the valve 62 is also vented to atmosphere. During this running condition the pressure in the reservoir 56 will be decreased through the conduit 59 and check valve 61.

As the speed of the engine increases and/or the load increases due to opening of the throttle valves 28, there will be an increased charge delivered to the chambers 16. This charge will be delivered primarily through the primary intake passages 33. Eventually, the engine will demand a charge flow which exceeds the capacity of the single cylinder head intake passage 19. A certain speed and load range will be reached wherein the restriction to flow generated by the size of the primary intake passage 33 and the intake valve 22 will prevent sufficient charging of the chamber 16. It has been found that when this condition prevails, there will be a reduction in the torque generated by the engine.

In order to improve transitional running and torque characteristics, a passage 71 is formed in the cylinder head which connects the passages 19 with each other. The passage 71 is formed at the end of a wall 72 that divides the cylinder head passages 19 from each other. The connecting passage 71 is formed immediately adjacent the downstream side of the control valve 41 and in close proximity of the intake valves 22 and intake ports 21. Preferably, the effective cross-sectional area of the passage 71 is equal to the effective cross-sectional area of the primary manifold passage 33.

When the speed of the engine 11 exceeds that as predetermined by the speed switch 67, the valve 63 will be actuated so that the conduit 55 is connected with the load responsive valve 62. If the intake manifold vacuum is such as to indicate a low load so that the load responsive valve 62 is not actuated, the actuator chamber 48 will still be vented to the atmosphere. As the load on the engine increases above a predetermined amount and the manifold vacuum decreases (absolute pressure increases), the vacuum acting on the valve 62 will no longer be sufficient to maintain it in its venting condition and the spool of the valve 62 will move so as to connect the reservoir 56 with the actuator chamber 48. At this time the atmospheric pressure acting in the chamber 47 will exceed the reduced pressure now existent in the chamber 46 to cause the spring 54 to be compressed and the diaphragm 49 to move so as to open the control valve 41. Thus, the charge will be delivered to the chamber 16 through both the primary 33 and secondary 34 passages of the intake manifold 31. As a result good volumetric efficiency is achieved and maximum output may be attained. The provision of the interconnecting passage 71 also improves mid range torque of the engine.

Figure 3:
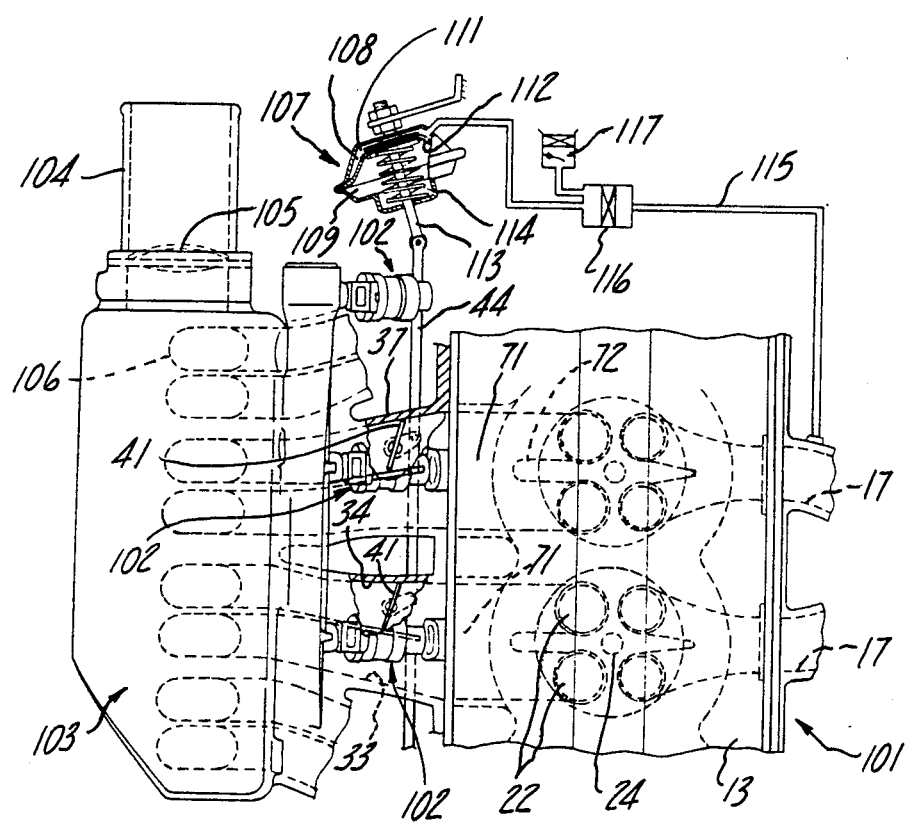
FIG. 3 is a top plan view, in part similar to FIG. 2, showing another embodiment of the invention.

Embodiment of FIG. 3.

An engine constructed in accordance with another embodiment of the invention is shown in FIG. 3 and is identified generally by the reference numeral 101. In many regards the engine 101 is similar to the previously described embodiment. Components that are the same or substantially the same in construction and operation have been identified by the same reference numerals and will not be described again in detail, except insofar as necessary to understand this embodiment.

In this embodiment, rather than using a carburetor as a charge forming device, a fuel injection system is employed. The fuel injection system includes a plurality of fuel injection nozzles, indicated generally by the reference numeral 102. Each fuel injection nozzle 102 is positioned adjacent the valve block 37 and is disposed to discharge into the cylinder head intake passages 19 in proximity to the connecting passage 71. Specifically, each nozzle 102 is disposed so that its fuel discharge will intersect the wall 72 of the cylinder head so that the fuel delivered from each nozzle 102 will flow into the combustion chambers 16 regardless of the air flow path to the chamber 16. That is, the fuel from the nozzles 102 will flow into the combustion chamber 16 regardless of whether the air charge is being delivered only by the primary intake passge 33 or both the primary and secondary intake passages 33, 34.

In this embodiment the manifold per se is eliminated and an air intake device, indicated generally by the reference numeral 103, is provided. The air intake device 103 has an air inlet 104 in which a main throttle valve 105 is positioned. The main throttle valve 105 is controlled by the operator of the vehicle through a suitable linkage system (not shown). Individual air outlets 106 extend from the inlet devices 103 to the respective primary 33 and secondary 34 passages of the valve block 37.

The control valves 41 are, as in the previously described embodiment, also connected by a link 44 so as to operate in unison. In this embodiment a pressure responsive device, indicated generally by the reference numeral 107, is provided for actuating the control valves 41. The pressure responsive device 107 is responsive to engine speed and load and in this embodiment this is achieved by sensing the pressure of the exhaust gases in one of the passages 17.

The pressure responsive device 107 includes an outer housing 108 that is divided into an atmospheric chamber 109 and a pressure sensing chamber 111 by means of a diaphragm 112. An actuating rod 113 is connected to the diaphragm 112 and is pivotally connected to the link 44 for operating the control valves 41.

The atmospheric chamber 109 is exposed to atmospheric pressure through a clearance which exists between the housing 108 and the rod 113. A coil compression spring 114 is positioned in the chamber 109 and normally urges the diaphragm 112 and link 44 to a position wherein the control vales 41 are closed The sensing chamber 111 is exposed to pressure in one of the exhaust passages 17 by means of a conduit 115. A filter 116 is positioned in the conduit 115 so as to reduce the number of foreign particles which may be delivered to the sensing chamber 111. The side of the filter 116 adjacent the sensing chamber 111 is selectively exposed to atmospheric pressure through a check valve and filter assembly 117. At such times as the pressure in the exhaust passage 117 is less than atmospheric, as occurs due to the pulsations in the exhaust system, the check valve 117 will open and cause a reverse air flow through the filter 116 that will cause any entrapped foreign particles to be discharged to the atmosphere through the exhaust system.

This embodiment operates in a manner similar to the previously described embodiment. At low engine speeds and loads there will not be sufficient pressure in the exhaust system so as to overcome the atmospheric pressure and the action of the spring 114 in the actuator 107. Thus, the control valves 41 will be closed and the engine charge requirements will be delivered primarily through the primary intake passages 33. As has been noted, the disposition of the fuel injection nozzles 102 is such that their fuel discharge can flow into a combustion chamber 16 through the primary intake passage 33.

As the load on the engine increases and its operational speed increases due to the opening of the manually operated throttle valve 105, a point will be reached where the restriction of the intake valve 22 associated to the primary intake passage will prevent sufficient charge to be delivered through only one of the intake valves 22. Under this condition, a portion of the intake charge will pass through the connecting passageway 71 and be delivered through the other intake valve 22. Again, as has been noted, the disposition of the fuel injection nozzle 102 so that the discharge onto the wall 72 will insure that a fuel air mixture is introduced through both intake valves 22. As the speed and load of the engine 101 continues to increase, the pressure of the exhaust gases in the passage 17 will eventually become sufficient so as to overcome the action of the spring 114 and the diaphragm 112 and rod 113 will cause the control valves 41 to open. Thus, volumetric efficiency will be improved and maximum power output will be attained.

Figure 4:
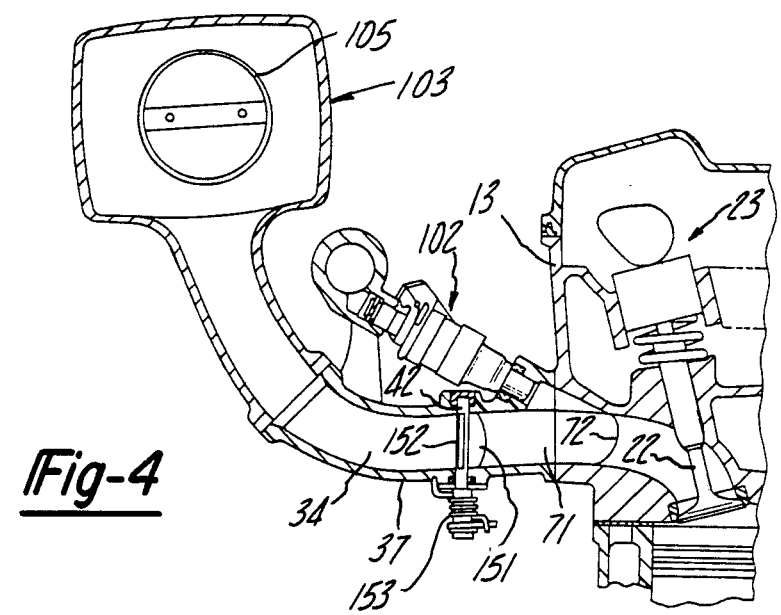
FIG. 4 is a partial cross-sectional view, in part similar to FIG. 1, showing a still further embodiment of the invention.
Figure 5:
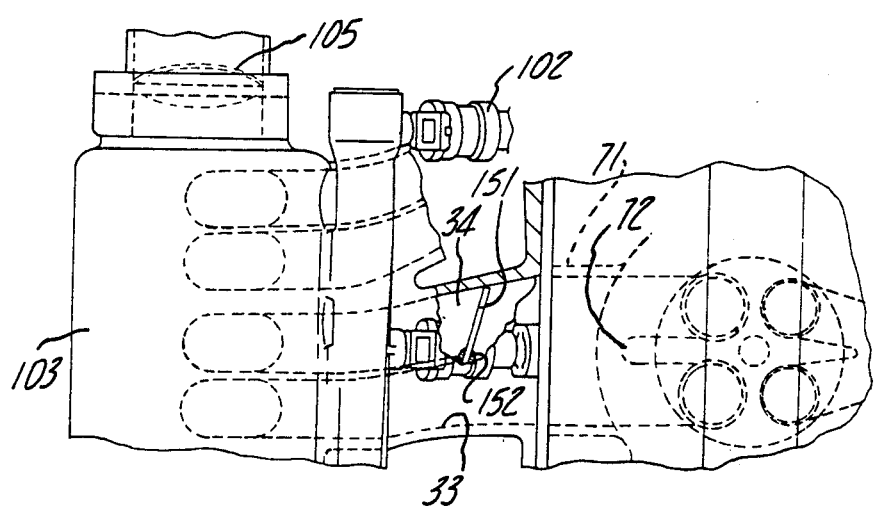
FIG. 5 is a partial top plan view of the embodiment shown in FIG. 4 with a portion broken away.

Embodiment of FIGS. 4 and 5

FIGS. 4 and 5 illustrate another embodiment of the invention which is similar in some regards to the embodiment of FIGS. 1 and 2 and in other regards to the embodiment of FIG. 3. Where the components of this embodiment are the same or similar to those of the previously described embodiments, they have been identified by the same reference numerals and their description will not be repeated.

In conjunction with this embodiment, a diaphragm actuator for the control valves of the secondary intake passages is obviated through the use of a valve element that is itself pressure responsive. In conjunction with this embodiment, a control valve 151 for each cylinder has a generally semi-circular configuration and is supported for rotation on the throotle valve shaft 152 that is disposed at one side of the secondary air passage 34. A torsional spring 153 encircles the exposed parts of the control valve shaft 152 so as to determine the pressure at which the control valve 151 will open.

When the engine is running at low speeds and low loads, the pressure differences on the opposite side of the control valve 151 will be insufficient to overcome the action of the spring 153 and the control valve 151 associated with each cylinder will be held in a closed position. Thus, as with the previously described embodiments, the charge requirements of the combustion chambers will be supplied through the primary intake passage 33. As the load on the engine and its speed increases, parts of the charge will flow through the connecting passage 71 and be inducted into the chambers through both intake valves 22. Eventually, the speed and load on the engine will be sufficient so that a pressure difference will be exerted on the control valve 151 so as to cause it to pivot in opposition to the action of the spring 153 to its open position. In all other regards the operation of this embodiment and is advantages are as described in conjunction with the other embodiments. For that reason this information will not be repeated.

Figure 6:
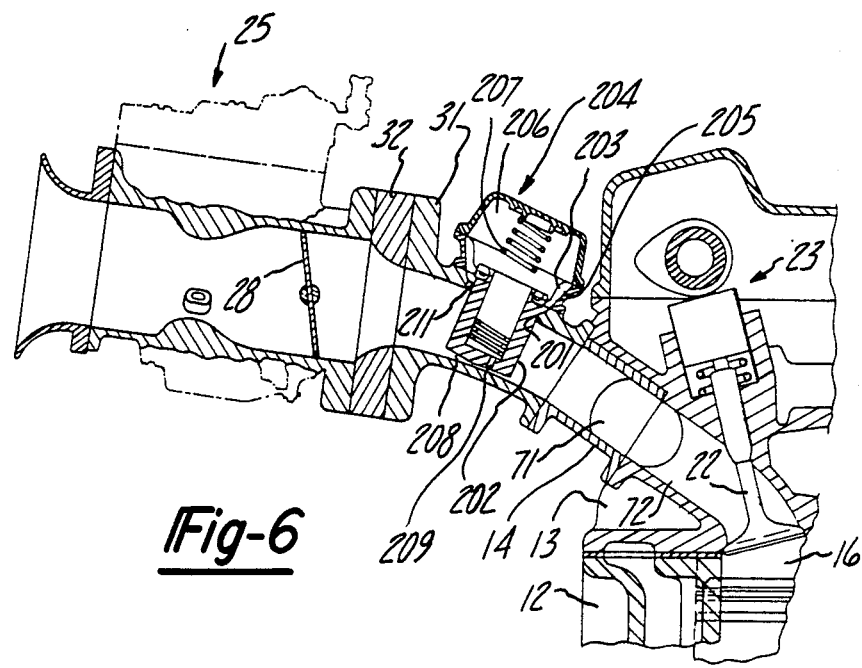
FIG. 6 is a partial cross-sectional view, in part similar to FIGS. 1 and 4, and shows a still further embodiment of the invention.
Figure 7:
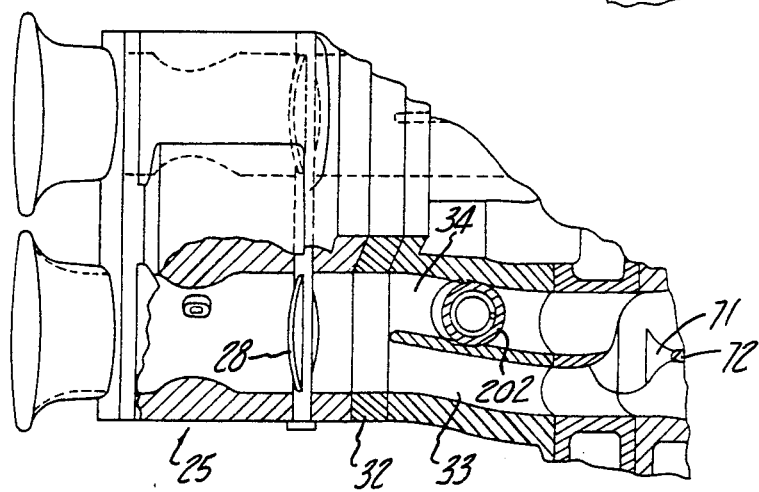
FIG. 7 is a partial top plan view with portions broken away of the embodiment shown in FIG. 6.

Embodiment of FIGS. 6 and 7

These figures illustrate another embodiment of the invention employing a piston type control valve that is positioned in the intake manifold secondary air passages 34. In other regards this embodiment is the same as that of FIGS. 1 and 2, and for that reason components which are the same and function the same will not be described again. In this embodiment the intake manifold 31 is formed with bores 201 that intersect each of the secondary air passages 34. A piston 202 is slidably supported with the bore 201 and is connected at its upper end to a diaphgram 203. The diaphragm 203 is clamped within a housing assembly 204 to divide it into pressure chambers 205 and 206. A compression spring 207 is contained within the chamber 206 and acts against the piston 202 to urge it toward a closed position. A venturi throat 208 is formed between the lower end of the piston 202 and the manifold wall defining the passage 34.

The chamber 206 on the upper side of the diaphragm 203 and piston 202 is exposed to the pressure at the venturi throat 208 through a sensing port 209. The pressure on the underside of the diaphragm 203 in the chamber 205 is exposed to upstream pressure in the air passage 34 via a sensing port 211.

When the engine is running at low speeds, there will be little air flow through the venturi throat 208 and the spring 207 will overcome the atmospheric pressure acting in the chamber 205 to hold the piston 202 in a substantially fully closed position so that the primary charge requirements of the engine will be served through the primary air passage 33. As the speed and load on the engine increases, eventually there will be sufficient air flow inducted through the throat 208 to cause sufficient pressure reduction in the chamber 206 to cause the piston 202 to be driven upwardly against the action of the spring 207. Thus, additional flow to the chamber 16 will be provided through the secondary passage 34. It should be readily apparent, therefore, that this embodiment will operate in the same manner as the previously described embodiments and provide the same results.

It should be readily apparent that several embodiments of the invention have been disclosed, each of which achieves good performance at low and medium speeds without sacrificing maximum power output.

This is achieved by closing the secondary air passage by means of the control valve under low and medium speed running. The interconnecting communication passage insures good transition during change over from low load and speed conditions to wide open performance and improve the mid-range torque. Although several embodiments have been disclosed, it is to be understood that various other changes and modifications may be made without departing from the spirit and scope of the invention, as defined by the appended claims.

We claim:

1. In an induction system for an internal combustion engine of the type having a pair of intake ports for providing an air charge to a common chamber of the engine, first and second intake passages each independently serving a respective one of said intake ports, throttle valve means for controlling the flow through said induction system, the improvement comprising an interconnecting passage extending transversely between said first intake passage and the second intake passage downstream of said throttle valve means and upstream of said intake ports and a fuel injection nozzle discharging against a transverse wall that defines a portion of said interconnecting passage in a downstream direction relative to the interconnected portion of said first and second intake passages.

2. An intake system as set forth in claim 1 further including means for operating the throttle valve means so that an idle charge is delivered to the chamber through the first intake passage and wide open load charge requirements are supplied through both of the intake passages.

3. An intake system as set forth in claim 1 wherein the first and second intake passages are separated in part by a common wall through which the interconnecting passage extends.

4. An intake system as set forth in claim 3 further including means for operating the throttle valve means so that an idle charge is delivered to the chamber through the first intake passage and wide open load charge requirements are supplied through both of the intake passages.

5. In an induction system for an internal combustion engine comprising a chamber, a first intake passage communicating with said chamber through a first intake port, a second intake passage communicating with said chamber through a second intake port, said intake passages having a common portion upstream of their communication with said chamber, the improvement comprising a first, manually operated throttle valve in said common portion of said intake passages, a second throttle valve in said second intake passage between said first throttle valve and said second intake port, means for operating said second throttle valve in response to an engine running condition and means communicating said intake passages with each other downstream of said second throttle valve and upstream of said intake ports for flow into said chamber through both of said passages including when said second throttle valve is closed.

6. An intake system as set forth in claim 5, further including a pair of poppet type valves each associated with a respective of the intake ports for controlling the flow therethrough.

7. In an induction system as set forth in claim 5 wherein the means for operating the second throttle valve in response to an engine running condition includes means for automatically operating the said second throttle valve.

8. In an induction system as set forth in claim 7 wherein the means for automatically operating the second throttle valve comprises a vacuum motor having a chamber adapted to be selectively communicated with atmospheric pressure for holding the second throttle valve in one of its positions and induction system vacuum for holding the second throttle valve in the other of its positions.

9. In an induction system as set forth in claim 8 wherein the means for selectively communicating the vacuum actuator comprises means responsive to intake air flow.

10. In an induction system as set forth in claim 8 wherein the means for selectively communicating the vacuum actuator comprises means responsive to engine speed.

11. In an induction system for an internal combustion engine of the type having a pair of intake ports for providing a charge to a common chamber of the engine, separate intake passages each independently serving a respective one of said intake ports, throttle valve means for controlling the flow through said intake passage so that an idle charge is delivered to said chamber through a first of said intake passages and wide open load charge requirements are supplied through both of said induction passages, the improvement comprising an interconnecting passage extending between said first intake passage and the second intake passage in proximity to said intake ports downstream of said throttle valve means and upstream of said intake ports for communicating said intake passages with each other regardless of the position of said throttle valve means for flow to said chamber through each of said intake ports regardless of the position of said throttle valve means.

12. An intake system as set forth in claim 11 further including a pair of poppet type intake valves each associated with a respective of the intake ports for controlling the flow therethrough.

13. An intake system as set forth in claim 11 wherein the first and second intake passages are separated in part by a common wall through which the interconnecting passage extends.

14. An intake system as set forth in claim 13 wherein the interconnecting passage has an effective cross-sectional area at least equal to the effective cross-sectional area of the first intake passage.

15. An intake system as set forth in claim 13 further including a fuel injection nozzle disposed to have its fuel discharge directed for impingement upon the separating wall.

16. An intake system as set forth in claim 11 further including means for operating the throttle valve means in response to a load on the engine.

17. An intake system as set forth in claim 16 wherein the throttle valve means comprises a piston type valve positioned in the second intake passage.

18. An intake system as set forth in claim 17 wherein the piston type valve is actuated in response to the flow through the second intake passage.

19. An intake system as set forth in claim 16 wherein the throttle valve means comprises an unbalanced valve positioned in the second intake passage and operable to open in response to pressure differences thereacross.

20. An intake system as set forth in claim 19 wherein the unbalanced valve is supported on a throttle valve shaft that is eccentrically exposed to the second intake passage.

21. An intake system as set forth in claim 16 wherein the operating means is responsive to a pressure in the engine.

22. An intake system as set forth in claim 21 wherein the pressure comprises the pressure in an exhaust system of the engine.

23. An intake system as set forth in claim 21 wherein the pressure comprises a pressure in the induction system.

24. An intake system as set forth in claim 23 wherein the operating means comprises a diaphragm type actuator having a first chamber exposed to atmospheric pressure and a second chamber adapted to be selectively communicated with a sub-atmospheric pressure generated in the induction system for opening the throttle valve means or with atmospheric pressure for closing the throttle valve means, the means for selectively communicating the second chamber with the induction system comprising speed responsive valve means and load responsive valve means.

* * * * *